US006591473B1

(12) United States Patent
Child

(10) Patent No.: US 6,591,473 B1
(45) Date of Patent: Jul. 15, 2003

(54) METHOD OF RELEASING A LOCKED DOOR ON AN AUTOMOTIVE VEHICLE WHEN THE KEY IS UNAVAILABLE

(75) Inventor: Frank Child, Cody, WY (US)

(73) Assignee: Steck Manufacturing Company, Inc., Dayton, OH (US)

( * ) Notice: Subject to any disclaimer, the term of this patent is extended or adjusted under 35 U.S.C. 154(b) by 18 days.

(21) Appl. No.: 09/455,064

(22) Filed: Dec. 6, 1999

Related U.S. Application Data

(60) Provisional application No. 60/111,056, filed on Dec. 7, 1998.

(51) Int. Cl.[7] ................................................ B23P 19/00
(52) U.S. Cl. ....................................... 29/426.1; 81/15.9
(58) Field of Search ........................... 70/465; 81/15.9; 29/426.1, 804

(56) References Cited

U.S. PATENT DOCUMENTS 2,027,009 A 1/1936 Wyscaver
2,344,696 A 3/1944 Graham
2,732,739 A * 1/1956 Liss ........................... 81/15.9
3,438,290 A * 4/1969 Konopacki .................. 81/15.9
4,608,886 A 9/1986 Bolton
4,683,783 A 8/1987 Fanberg
4,706,525 A * 11/1987 Fenner ....................... 81/15.9
4,836,061 A * 6/1989 Weinraub ................... 81/15.9
4,882,954 A 11/1989 Selby
4,941,073 A 7/1990 Bolton
5,104,094 A 4/1992 Womack

OTHER PUBLICATIONS

Zip's Truck Equipment, Inc. website. http://www.towman-.com/zips/warehousespecials.com.*
Slide Lock Tool Co, Inc. Louisville TN 37777 Z. Tool System.

* cited by examiner

*Primary Examiner*—Gregory Vidovich
*Assistant Examiner*—Marc Jimenez
(74) *Attorney, Agent, or Firm*—Joseph G. Nauman

(57) ABSTRACT

A method of releasing the door lock of an automotive vehicle is disclosed, using as a prying tool a wedge of dense plastic material and an elongated rod-like probe with a short tip, at the end of the probe to be inserted, extending generally perpendicular to the length of the probe, and a handle at the other end of the probe to facilitate manipulation of the probe. By inserting the prying tool into the gap between a door and its door frame on the vehicle body, at a location opposite the door hinges, and using the tool to pry out a portion of the perimeter of the door sufficiently to achieve access to a resilient weatherstrip between the door and door frame, to release pressure locally on the weather-strip sufficiently, it s possible to insert the probe past the weatherstrip, at the locality where pressure is released on the weatherstrip, into the interior of the vehicle without damaging the weatherstrip or the door or the door frame. The tip of the probe is then caused to manipulate an unlocking mechanism interior of the vehicle.

2 Claims, 4 Drawing Sheets

METHOD OF RELEASING A LOCKED DOOR ON AN AUTOMOTIVE VEHICLE WHEN THE KEY IS UNAVAILABLE

RELATED APPLICATION

This application is based upon U.S. Provisional Patent Application Ser. No. 60/111,056 filed Dec. 7, 1998.

BACKGROUND OF THE INVENTION

This invention relates to a method of releasing a lock in a closed vehicle in a situation where the doors are locked and keys or other means of releasing the locks are not available. In many cases the situation includes the need for a third party such as a tow vehicle operator or a law enforcement officer requires access to the interior vehicle controls for releasing brakes or otherwise preparing to move the (often disabled) vehicle. Typically, such need arises when a towing service is called and the vehicle is locked with the owner not present, or the only available keys locked inside.

SUMMARY OF THE INVENTION

The present invention provides a tool kit (the individual items of which are per se known) and a method of using the tools in a cooperative manner which enables a user to perform an entry method into the locked vehicle so as to to actuate the door handle, or a manual lock button, or electric lock button, or the lock pin, on almost all cars and trucks of modern design. Thus the method permits a party to gain entry when the vehicle is accidentally locked and must be entered for some reason. The use of the tools in manipulative methods provides unique, simple, and quick entry to a vehicle.

An advantage of the invention is that every movement of the tools is in full view of the user through the door window. Unlocking vehicles is quick and easy such that little training is needed for the users. Equally important, dangers of side air bag activation or disconnected or damaged in-door wiring or linkages are avoided. The smooth plastic wedge insert tool is safe to use, and there is little risk of damage to the door or weatherstripping.

PREFERRED EMBODIMENT OF THE INVENTION

The Tool Kit

Figure 2:
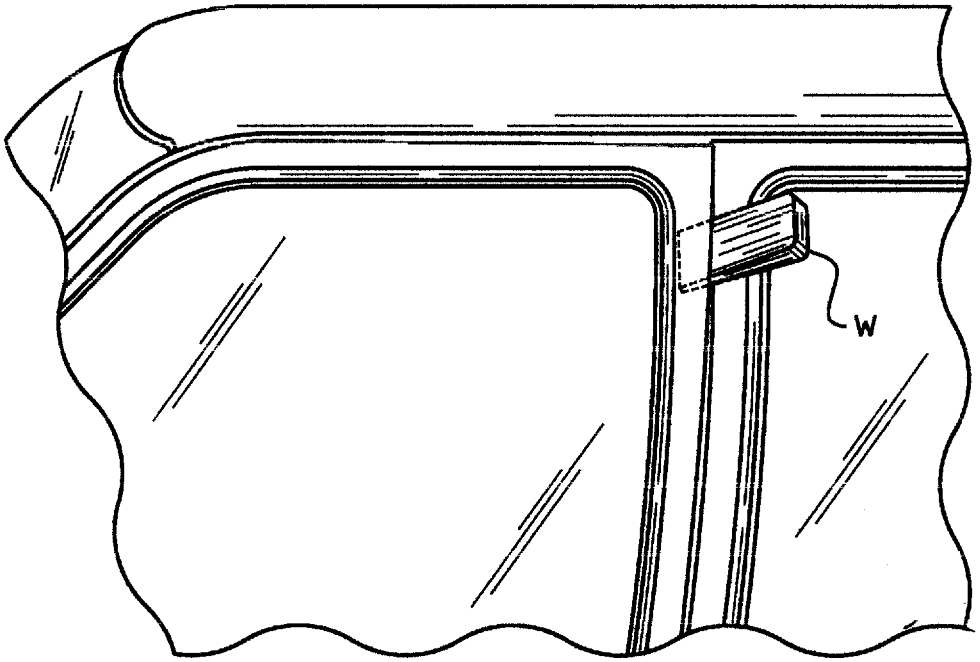
FIG. 2 is a perspective view showing a wedge tool used to form a small gap in the sealed location of the upper rear corner of a closed vehicle door.
Figure 3:
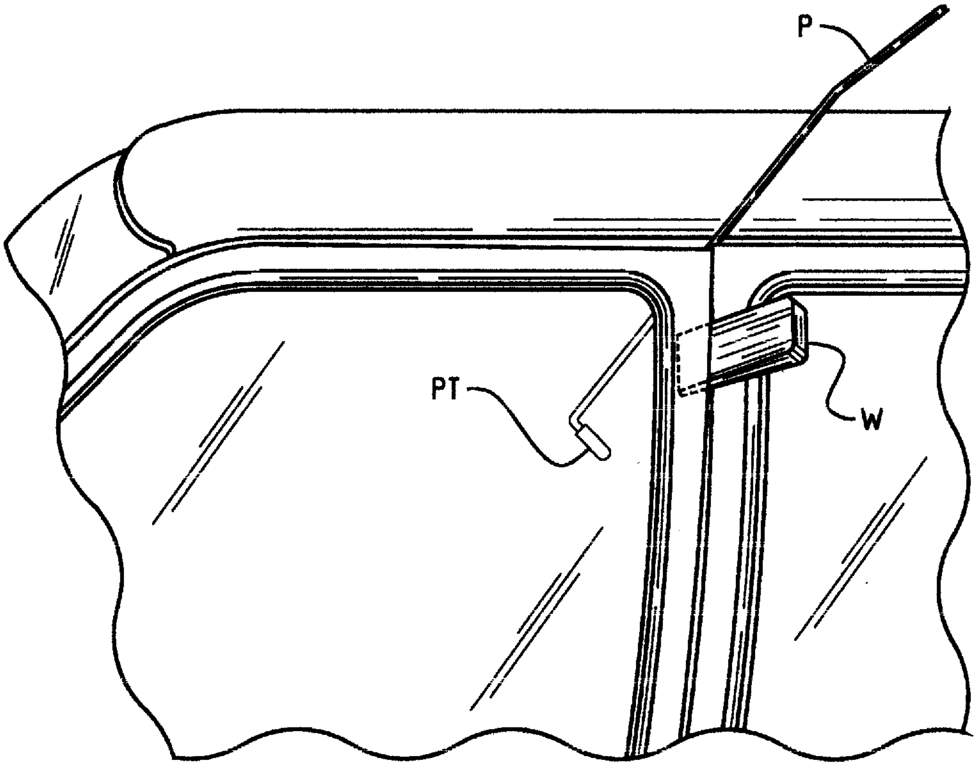
FIGS. 3 & 4 show the probe tool inserted through the door seal gap, allowing the user to view progress of the probe through the window in the door.
Figure 4:
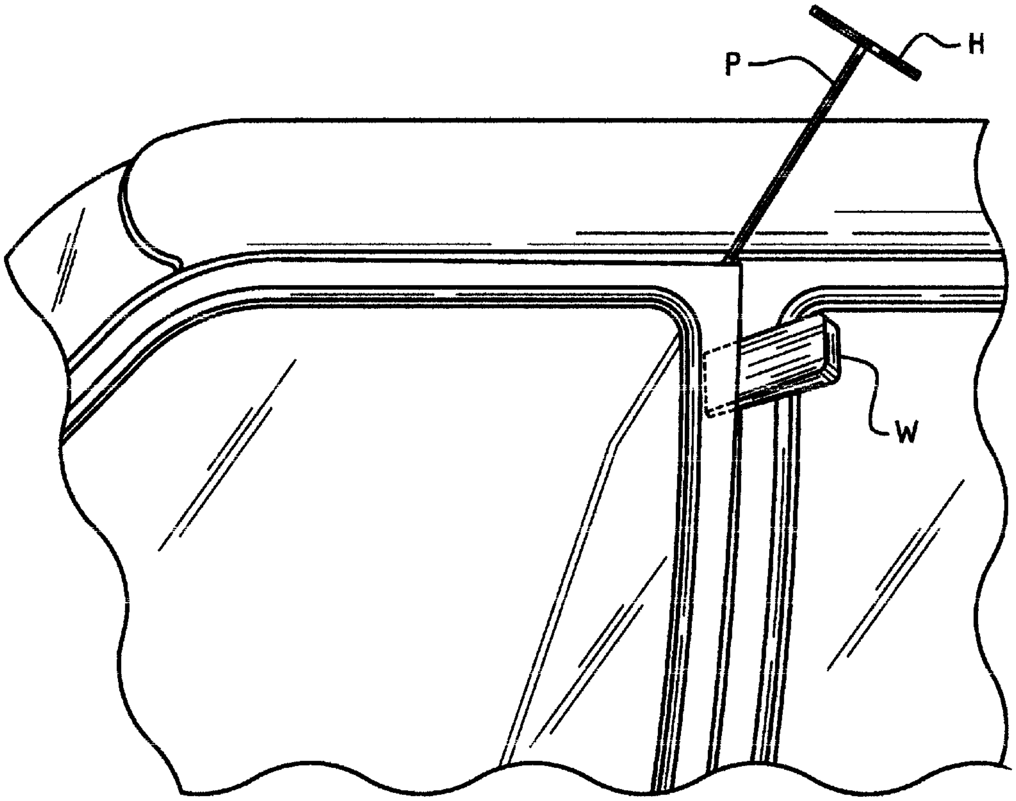

The kit of tools, includes a dense plastic wedge W with smooth surfaces, to be inserted under the upper edge of a closed vehicle door, between the rim of the door and the flexible weatherstrip which surrounds the door perimeter (FIGS. 2 & 4). The insertion location should be adjacent the corner of the door farthest removed from the door hinges, usually referred to as the uppermost rear corner of the front door frame.

Figure 1:
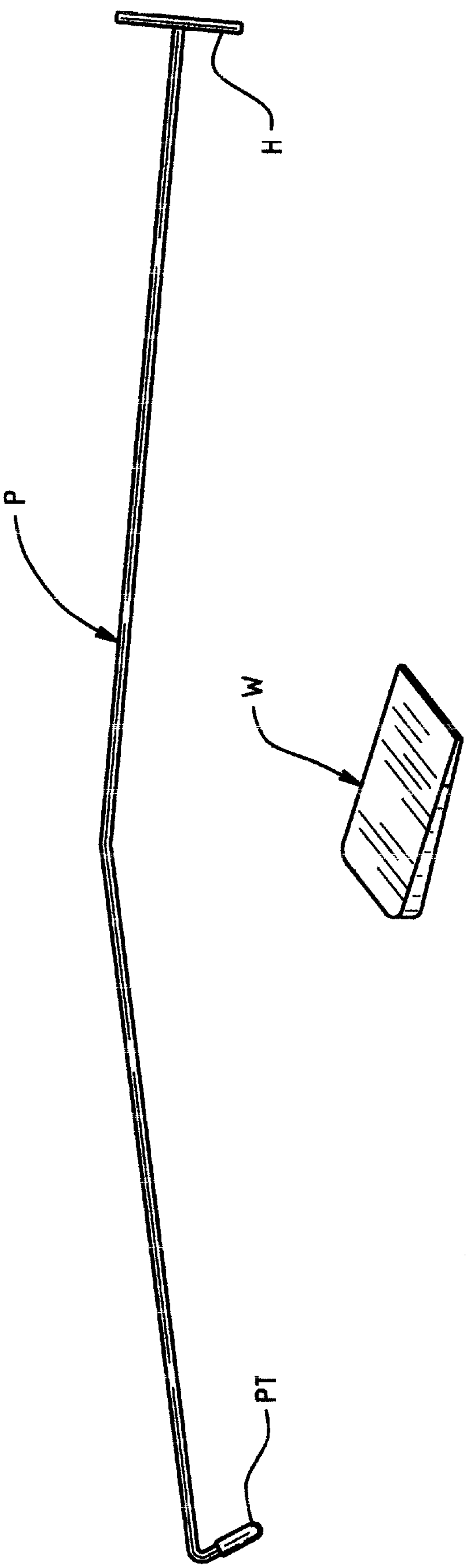
FIG. 1 is a view of the tools provided for use of the method of the invention.

The other tool is a long rod-like metal probe and actuator P having a tip PT at one of its ends extending approximately perpendicular to the length of the probe, and having a handle H at its opposite end for manipulating the probe. A typical embodiment of the probe is 56 inches in length, and is formed from 0.250 inch diameter cold rolled steel. The probe is essentially rigid, but is somewhat flexible along its length due to its diameter/length ratio. The probe preferably has a slight bend approximately midway of its length (see FIG. 1).

Method of Releasing the Door Lock with the Probe

The method of opening by releasing the door lock is as follows. Each vehicle will be a little different, but generally the user will start the wedge W into the door gap between the door perimeter and the door frame in the vehicle body and use the wedge to pry out the door perimeter (FIG. 2) enough to see where the weatherstrip seal contacts the body. Tapping the wedge, with a tool or the heel of the hand, the user carefully guides the wedge between the door frame and the door perimeter. The user continues inserting the wedge, relieving the pressure of a region of the door perimeter against the resilient weatherstrip seal, until there is enough gap to insert the probe P easily past the weatherstrip into the interior of the vehicle, depending upon the situation and the type of vehicle.

This small amount of prying on the upper door corner will not result in any permanent bending of the door or tearing the associated weatherstrip. The flexure of the door, as a whole, is well within the elastic limits of the materials. The resultant small gap between the door perimeter and the weatherstrip seal need be but a fraction of an inch, usually in the order of ¼ to ⅜ inch. This operation, if accomplished with ordinary care, will not mar damage the weatherstrip, the door frame, nor the door.

Figure 5:
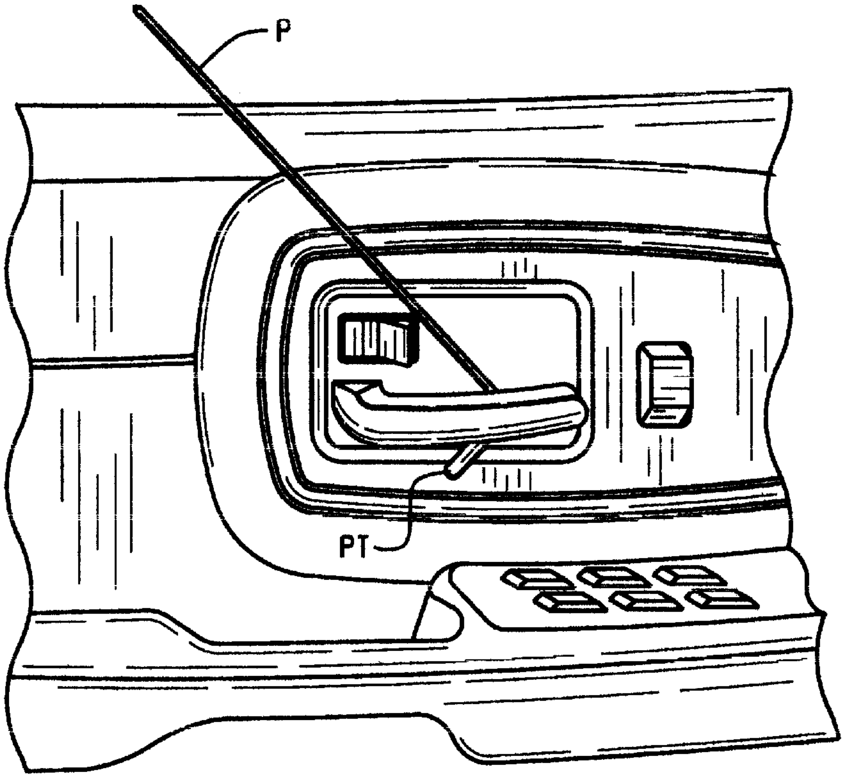
FIG. 5 shows the probe tip hooked about an internal door latch, to pull and release the door latch.
Figure 6:
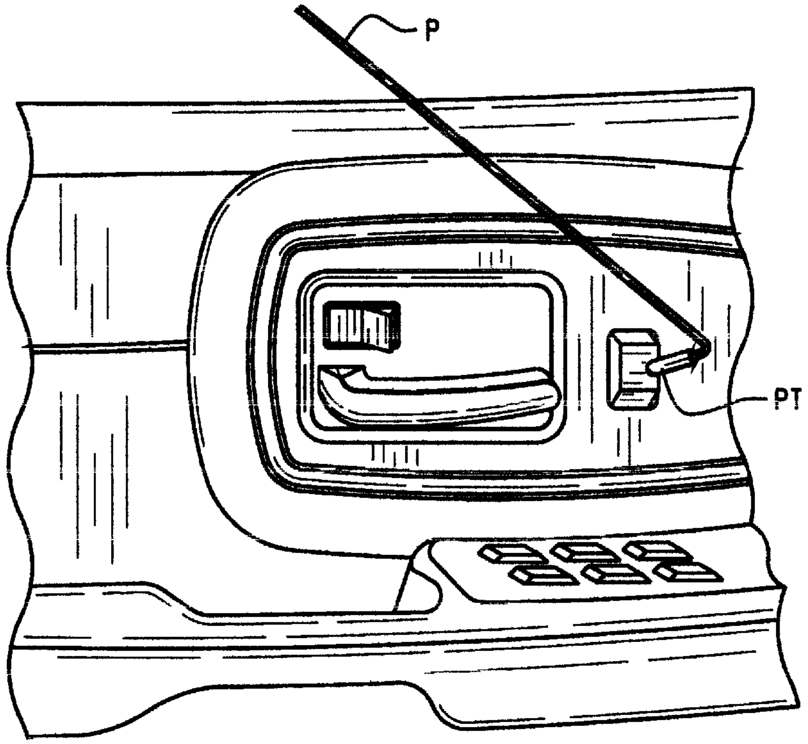
FIG. 6 shows the tip of the probe tool pressing against an electric door lock release.
Figure 7:
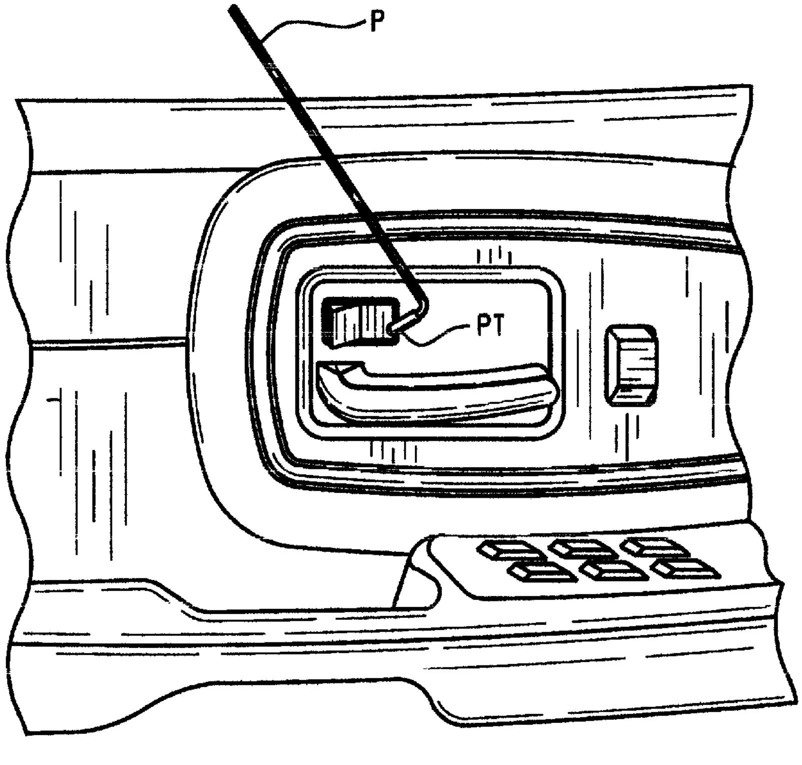
FIG. 7 shows the tip of the probe actuating a toggle type door lock switch.

The user will insert probe P through the gap where pressure on the weatherstrip is relieved on the interior of the door, and into the vehicle interior and use the tip of the probe to manipulate the electric lock button, or the sliding lock button, or the door opening handle (FIGS. 5–7), whichever is presented and easily reached. If the bend in the probe is not sufficient, the probe can be withdrawn and the bend adjusted to the required configuration for the vehicle at hand. Releasing the door lock can be accomplished by manipulating one of the lock controls as mentioned above. All the while the user has a good view of the interior through the windows of the vehicle.

While the method herein described, and the tools for carrying this method into effect, constitute preferred embodiments of this invention, it is to be understood that the invention is not limited to this precise method and tools, and that changes may be made in either without departing from the scope of the invention, which is defined in the appended claims.

What is claimed is:

1. The method of gaining access to the interior of a locked automotive vehicle having a door with an inner surface and an outer surface, the door being supported by a hinge mechanism to move into and out of a door frame in the vehicle, the door having a shaped perimeter adapted to interact with a door seal weatherstrip in the door frame engaging the door perimeter when the door is closed, the door also including a window frame surrounding a window pane and a latch including a lock mechanism and a separate locking mechanism actuator on the interior surface of the door below the window frame for operating the lock mechanism in a situation wherein the window pane is closed and the door is latched and locked in the door frame, and the key to the locking mechanism is unavailable;

comprising the steps of using a prying tool to move a portion of the door perimeter away from the door seal and an elongated probe to extend through the resulting space between the door perimeter and the seal to actuate a separate locking mechanism actuator interior of the vehicle by a) inserting the prying tool into the gap between the door perimeter and the door frame at a location along the door frame and opposite the door hinge mechanism, b) using the prying tool to flex outward a portion of the door perimeter sufficiently to achieve access to the seal between the portion of the door and door frame and to relax the pressure against the seal weatherstrip at such location, c) inserting the probe into the vehicle interior at the location where pressure is released on the seal weatherstrip, and d) using the tip of the probe to manipulate a separate locking mechanism actuator interior of the vehicle so as to unlock the locking mechanism.

2. The method defined in claim 1, wherein e) the prying tool is a wedge of dense plastic material, f) the probe is an elongated rod-like member including a short tip at one end of such member and extending generally perpendicular to the length of the probe, and g) a handle at the other end of the probe to facilitate manipulation of the probe and its tip when inserted into the vehicle interior.

* * * * *